(12) United States Patent
Wu et al.

(10) Patent No.: US 9,172,465 B2
(45) Date of Patent: Oct. 27, 2015

(54) OPTICAL DEVICE, AND SYSTEM AND METHOD FOR MANAGING OPTICAL DEVICE

(71) Applicant: Huawei Technologies Co., Ltd., Shenzhen, Guangdong (CN)

(72) Inventors: Shiquan Wu, Shenzhen (CN); Faxian Sun, Shenzhen (CN); Yangxian Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 13/786,171

(22) Filed: Mar. 5, 2013

(65) Prior Publication Data
US 2013/0188966 A1 Jul. 25, 2013

Related U.S. Application Data

(63) Continuation of application No. PCT/CN2012/078844, filed on Jul. 19, 2012.

(30) Foreign Application Priority Data

Jan. 19, 2012 (CN) .......................... 2012 1 0022264

(51) Int. Cl.
*H04B 10/00* (2013.01)
*H04B 10/27* (2013.01)
*G02B 6/38* (2006.01)
*G02B 6/44* (2006.01)

(52) U.S. Cl.
CPC .............. *H04B 10/27* (2013.01); *G02B 6/3895* (2013.01); *G02B 6/4452* (2013.01)

(58) Field of Classification Search
USPC .................................................. 398/135–139
See application file for complete search history.

(56) References Cited

U.S. PATENT DOCUMENTS 5,394,503 A * 2/1995 Dietz et al. .................... 385/135
6,002,331 A * 12/1999 Laor .......................... 340/539.1
(Continued)

FOREIGN PATENT DOCUMENTS

| CN | 1949687 A | 4/2007 |
|---|---|---|
| CN | 101632314 A | 1/2010 |

(Continued)

OTHER PUBLICATIONS

International Search Report dated Nov. 15, 2012 in connection with International Patent Application No. PCT/CN2012/078844.

(Continued)

*Primary Examiner* — Agustin Bello

(57) ABSTRACT

The present invention relates to an optical device, including: an optical module, configured to implement an optical function of the optical device and including several outlet ports; and an identification module, containing identification information for identifying the optical device. The present invention further relates to a system and method for managing an optical device, where the system includes: an interface apparatus, configured to couple multiple optical devices; an identification information obtaining apparatus, configured to obtain identification information of the optical devices and/or identification information of outlet ports of the multiple optical devices through the interface apparatus; and a control apparatus, configured to manage the optical devices according to the obtained identification information.

5 Claims, 5 Drawing Sheets

(56) References Cited

U.S. PATENT DOCUMENTS

| | | | |
|---|---|---|---|
| 6,375,362 B1* | 4/2002 | Heiles et al. | 385/75 |
| 7,605,707 B2* | 10/2009 | German et al. | 340/572.8 |
| 7,760,094 B1* | 7/2010 | Kozischek et al. | 340/572.1 |
| 8,138,925 B2* | 3/2012 | Downie et al. | 340/572.8 |
| 8,210,755 B2* | 7/2012 | Lavranchuk | 385/53 |
| 8,233,804 B2* | 7/2012 | Aguren | 398/115 |
| 8,248,208 B2* | 8/2012 | Renfro, Jr. | 340/10.1 |
| 8,264,355 B2* | 9/2012 | Kozischek et al. | 340/572.1 |
| 8,477,031 B2* | 7/2013 | McNally et al. | 340/568.2 |
| 8,554,033 B2* | 10/2013 | Kewitsch | 385/101 |
| 8,556,163 B2* | 10/2013 | Wu et al. | 235/375 |
| 8,731,405 B2* | 5/2014 | Renfro et al. | 398/117 |
| 2003/0061393 A1* | 3/2003 | Steegmans et al. | 709/250 |
| 2006/0148279 A1* | 7/2006 | German et al. | 439/49 |
| 2007/0176745 A1* | 8/2007 | Gibson et al. | 340/10.1 |
| 2007/0296553 A1 | 12/2007 | Tokita et al. | |
| 2008/0100467 A1* | 5/2008 | Downie et al. | 340/686.2 |
| 2008/0220721 A1 | 9/2008 | Downie et al. | |
| 2010/0178058 A1 | 7/2010 | Kozischek et al. | |
| 2011/0088256 A1 | 4/2011 | Sasajima et al. | |
| 2012/0205446 A1* | 8/2012 | Wu et al. | 235/439 |
| 2013/0188966 A1* | 7/2013 | Wu et al. | 398/139 |
| 2014/0205298 A1* | 7/2014 | Moore et al. | 398/115 |

FOREIGN PATENT DOCUMENTS

| | | |
|---|---|---|
| CN | 101982797 A | 3/2011 |
| CN | 102042125 A | 5/2011 |
| CN | 102045125 A | 5/2011 |
| CN | 201957024 U | 8/2011 |
| CN | 102307107 A | 1/2012 |
| EP | 2 306 421 A1 | 4/2011 |

OTHER PUBLICATIONS

Written Opinion of the International Searching Authority dated Nov. 15, 2012 in connection with International Patent Application No. PCT/CN2012/078844.

* cited by examiner

OPTICAL DEVICE, AND SYSTEM AND METHOD FOR MANAGING OPTICAL DEVICE

CROSS-REFERENCE TO RELATED APPLICATIONS

This application is a continuation of International Application No. PCT/CN2012/078844, filed on Jul. 19, 2012, which claims priority to Chinese Patent Application No. 201210022264.8, filed on Jan. 19, 2012, both of which are hereby incorporated by reference in their entireties.

TECHNICAL FIELD

The present invention relates to an optical device, and a system and method for managing an optical device.

BACKGROUND

With the gradual popularization of FTTx technologies (where FTTH is fiber to the home, FTTP is fiber to the premises, FTTC is fiber to the curb, FTTN is fiber to the node, and so on), an optical distribution network (ODN) technology develops rapidly. An optical distribution network is a passive network, where resource management is mainly completed manually. As a result, optical fiber resource information of a current network is usually inconsistent with information in a resource management database, which brings great difficulty to work such as subsequent maintenance. In addition, a large number of inconsistent optical fiber resources cannot be effectively utilized, which results in a waste of network resources and increases a construction cost.

A conventional optical fiber network is passive, management of an optical fiber and a route of the optical fiber network totally relies on manual work. Due to unreliability of the manual work, conventional management of the optical fiber and the route of the optical fiber is in chaos, which causes disappearance of and difficulty in recognizing a large number of optical fiber resources, and causes a great cost and waste to construction and maintenance of an operator. As a result, some relevant intelligent optical fiber management technologies emerge, and can recognize a relationship between ports on the same optical fiber and a connection relationship between different optical fibers.

In the optical distribution network, many optical devices are used, including an optical splitter, an arrayed waveguide grating, an optical coupler, an optical switch, or the like.

Take the optical splitter as an example, the optical splitter is a passive functional device that implements an optical splitting technology at an optical splitting point, and is a core device in the ODN. An optical splitting ratio of the optical splitter ranges from 1:2 to 2:64. Loss of a 1×64 optical splitter is 19.7 dBs, and generally an ODN network in which a 1×64 optical splitter is applied cannot exceed 10 kilometers. A 2×n optical splitter provides two uplink ports, and may implement a protection mechanism of an FTTH network by cooperating with an OLT. According to different encapsulation forms, optical splitters may be classified into a modular optical splitter unit, a small-sized case-shape optical splitter unit, a 19-inch rack-mounted optical splitter unit, and so on.

Existing optical splitters are all passive, and all input/output ports are identified in a form of labels. If a digital identification is stuck, it is usually read and recorded manually; and if a graphic code is stuck, it is read by a barcode scanner. In this way, efficiency is very low, an error easily occurs, and an optical splitter port cannot be automatically recognized and a usage condition of the optical splitter port cannot be automatically obtained. An optical splitter module cannot be automatically recognized either.

In addition, a paper label is generally disposed on a port, and is used for recognizing a port number. However, once there are multiple optical splitters, it is hard to distinguish ports.

In the solution in Chinese Patent Application No. 200910110378.6, an optical splitter and a method and device for identifying an optical splitter port are disclosed. In this solution, only an electronic label is added to a port connector, and can be used for recognizing a port, but is incapable of recognizing an optical splitter module itself (especially in a case that no port connector is disposed in the optical splitter), and is also incapable of visually recognizing the optical splitter port and the optical splitter module.

SUMMARY

An embodiment of the present invention provides an optical device, including: an optical module, configured to implement, an optical function of the optical device and including several outlet ports; and an identification module, containing identification information for identifying the optical device.

An embodiment of the present invention further provides a system for managing an optical device, including: an interface apparatus, configured to couple multiple optical devices; an identification information obtaining apparatus, configured to obtain identification information of the optical devices and/or identification information of outlet ports of the multiple optical devices through the interface apparatus; and a control apparatus, configured to manage the optical devices according to the obtained identification information.

An embodiment of the present invention further provides a method for managing an optical device, including: coupling multiple optical devices; obtaining identification information of the optical devices and/or identification information of outlet ports of the multiple optical devices; and managing the optical devices according to the obtained identification information.

The optical device according to the embodiments of the present invention may be an optical device such as an optical splitter, an arrayed waveguide grating, an optical coupler, or an optical switch. In the present invention, the identification module is added to the optical module of the optical device, and meanwhile, a visual indicator may also be added, which implements automatic reorganization and visual management of the optical device, and may further implement intelligent management of the optical device.

BRIEF DESCRIPTION OF THE DRAWINGS

The following describes the technical solutions in embodiments of the present invention more clearly with reference to accompanying drawings. Persons skilled in the art may understand that, the described accompanying drawings in the following are all exemplary solutions of the present invention rather than limited solutions of the present invention.

DETAILED DESCRIPTION

An optical splitter described in the following is used as an example for describing an optical device in an embodiment of the present invention. Persons skilled in the art should understand that, the optical device in the present invention is neither limited to an optical splitter nor limited to the optical splitter described in the following embodiments, but is applicable to various optical devices having an outlet port, so as to implement management or control of the optical device by using identification information contained in the optical device. For example, the optical device in the present invention may also be an arrayed waveguide grating, an optical coupler, or an optical switch.

Embodiment One

Figure 1:
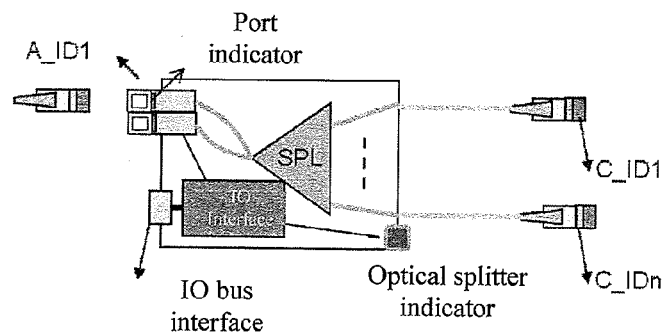
FIG. 1 is a schematic structural diagram of an optical splitter according to a first embodiment of the present invention.
Figure 2:
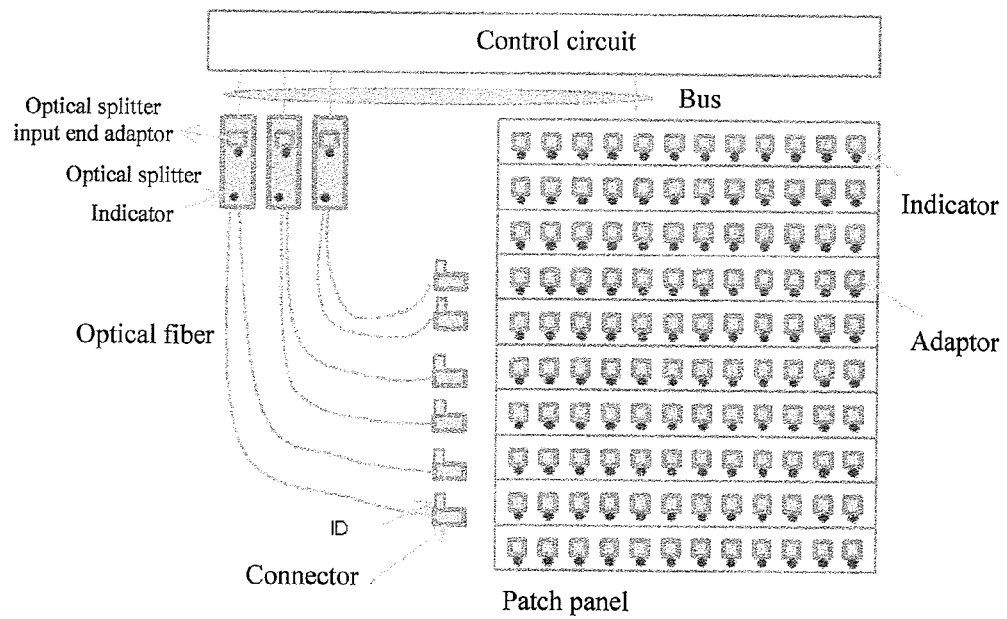
FIG. 2 is a schematic structural diagram of an optical splitter management system according to the first embodiment of the present invention, where an optical fiber adapter is adopted at an input end of an optical splitter.
Figure 3:
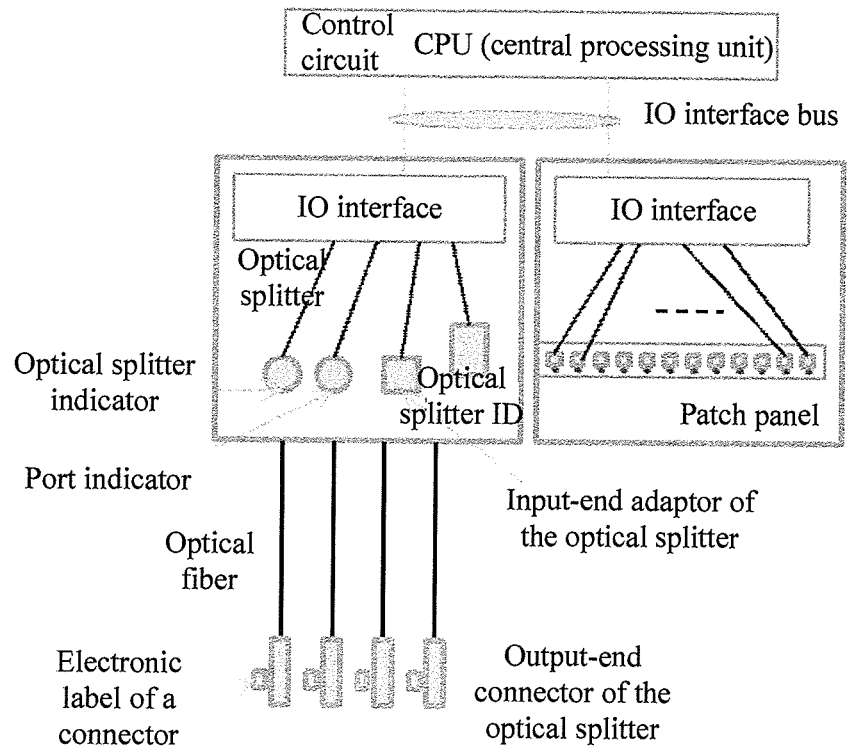
FIG. 3 is a schematic structural diagram of an optical splitter management system according to the first embodiment of the present invention, where a connector manner is adopted at an output end of an optical splitter.

FIG. 1 to FIG. 3 show a first embodiment of the present invention. In an optical splitter as shown in FIG. 1, an SPL is an optical splitter module (triangle), an optical splitter input end of the optical splitter module, which is shown on the left of the figure, is an optical fiber adapter containing recognition information A_ID1, n optical splitter output ends which are of the optical splitter module and are shown on the right of the figure all have a pigtail and a connector (containing corresponding identification information C-ID1, . . . , C-IDn). The optical splitter may further include an IO interface which is capable of connecting to an external control apparatus, and may include a memory (a small rectangular box on the bottom left of the figure) which stores identification information for recognizing the optical splitter and relevant information thereof. Electrical connections exist between the IO interface and the input end, output end, memory and external control apparatus. The external control apparatus may read recognition information through the IO (input/output) interface to recognize the optical splitter.

In this embodiment, the optical splitter may contain a read unit, configured to read recognition information (ID) of a connector which is inserted into the input end of the SPL, and a corresponding relationship exists between the ID of the connector and the recognition information A_ID1 of the optical fiber adapter of the input end. The ID of the connector may be used for recognizing which connector is inserted into the optical fiber adapter. In a case that a port of the optical splitter is an adapter, when it is required to insert a certain optical fiber into this port, the read unit reads an ID of a device or connector which is inserted into this port, so as to determine whether the optical fiber is inserted into a correct port. The memory has an ID of the SPL module (that is, optical splitter ID), which is used for identifying the optical splitter module, and a corresponding relationship between this ID and a connector (containing identification information C-ID of the connector) that needs to be connected at the pigtail exists.

An electronic label ID is disposed on the optical fiber adapter of the input end. A port number and an electronic recognition code (device ID) may be disposed on a connector of the output end, where a corresponding relationship between the electronic recognition code and the optical splitter ID exists For an optical splitter with a pigtail, there is a relationship between optical splitter ID and identification information C-ID of a connector. For example, a definition of a connector ID on an optical splitter, a definition of an optical splitter ID, and a relationship are shown in the following table:

| | Connector Identifier | Input Port Number | Output Port Number | Port Number | Connector Type | Optional Splitter ID |
|---|---|---|---|---|---|---|
| Definition Length (bit) | 64 | 2 | 12 | 14 | 4 | 64 |
| Definition | Unique coded information, namely, a connector ID | Generally, an optical splitter has one or two input ports | Generally, an optical splitter has two to 128 output ports | Port number of a current port | Identify a connector type, generally, connectors may be classified into multiple types, such as SC, LC, and FC, and meanwhile, according to different end faces, each type may also be classified into muliple sub-types, such as PC and APC. | This field is used for uniquely identifying this optical splitter, that is, an optical splitter ID. This field indicates that these connectors belong to this optical splitter ID. |

FIG. 2 shows a schematic structural diagram of an optical splitter management system according to an embodiment of the present invention, and this structure is a modular diagram of a typical cassette optical splitter with a pigtail. The figure especially shows an optical splitter input end. Optical fiber adapters of input ends of multiple optical splitters are disposed on a patch panel, and one optical splitter indicator is also disposed on each adapter. A connector connects to an input-end adapter through an optical fiber, and a connector ID for identifying the connector is disposed on the input-end adapter. Each optical fiber adapter and indicator may connect to an external control circuit through an IO interface and a bus. The external control circuit may read an optical splitter ID and a connector ID, so as to determine a connection state of each optical splitter and an outlet port of the optical splitter; and may also, according to a set operation of each optical splitter, control lighting, extinguishment, or flickering of an optical splitter indicator and a port indicator, so as to indicate a state of an optical splitter, a performed operation on or an operation state of an outlet port.

An adapter or a port into which a connector of an input end of an optical splitter is inserted is disposed on the patch panel in FIG. 2, and an adapter or a port into which a connector of an output end of the optical splitter is inserted is disposed on a patch panel in FIG. 3, where a port indicator is disposed on a port for insertion. An electronic label of a connector may be read through a port of a patch panel, so as to recognize the connector is a connector of which optical splitter. As shown in FIG. 1 and FIG. 3, each optical splitter contains an IO interface, an optical splitter module (SPL), an input-end adapter, an output-end connector, an optical splitter indicator, a port indicator, and an optical splitter electronic label (ID). An optical splitter ID is used for identifying an identity of an optical splitter, and the optical splitter ID may be read through an IO interface of the optical splitter. The optical splitter indicator may be, for example, configured to indicate which optical splitter needs to be operated. A port indicator of the optical splitter indicates which operations need to be performed on an input-end adapter of the optical splitter (for example, lighting of the indicator indicates that a connector needs to be inserted, and flickering of the indicator indicates that an inserted connector needs to be removed).

Identification information (ID) of the optical splitter SPL is saved in a memory (for example, an EEPROM), where the memory may be disposed on a casing of the optical splitter, and may also be disposed inside the optical splitter. The memory may be wired on a printed circuit board PCB and connected to the IO interface. As an electronic label of the SPL, generally, the memory may store information which includes but is not limited to: manufacture information (such as a manufacturer and a date of manufacture), an optical splitter attribute (an optical splitting ratio; an optical splitter type, for example, a pigtail type or an all adapter type), a recognition code, and some basic parameter information of the optical splitter (for example, a leave-factory test result of the optical splitter, including typical parameters such as insertion loss and polarization-dependent loss).

In this embodiment, as shown in FIG. 3, an optical fiber adapter, an optical splitter indicator and a port indicator of an optical splitter input end, and a memory which stores an optical splitter ID all connect to an external control circuit through an IO interface and an IO interface bus, and an output-end connector of the optical splitter and containing a connector electronic label connects to the optical splitter through an optical fiber. A to-be-connected adapter (on which a port indicator is disposed) on a patch panel also connects to the external control circuit through the IO interface and the IO interface bus.

When one optical splitter output end needs to be inserted into the patch panel, a typical process is as follows:

(1) The external control circuit controls, through the bus, a port into which an optical splitter having a certain optical splitter ID needs to be inserted, and meanwhile, lights up a corresponding port indicator on the patch panel, and lights up, through a control circuit, an indicator of an optical splitter that needs to be used. (2) An operating person finds an idle output-end connector through the optical splitter indicator, and inserts the connector into a lit adapter on the patch panel. (3) The external control circuit reads an ID of the connector inserted into the adapter on the patch panel, and according to the read ID, determines whether it is a required corresponding port of the optical splitter module; if it is the required port, it indicates that a connection is correct, and then a corresponding port indicator on the patch panel is extinguished under control of the external control circuit, so as to give a prompt that an insertion operation is correct; otherwise, a prompt about an insertion operation error may be given by means of controlling the port indicator to flicker.

For an optical splitter with a pigtail, a method for finding an idle output-end connector is to find the optical splitter according to an optical splitter indicator first; generally, an unused connector is uniformly placed in one place, and may be easily found according to optical fibers stretching out of the optical splitter. If a certain optical splitter does not need to be operated any more, the external control circuit may extinguish the indicator of the optical splitter.

Embodiment Two

Figure 4:
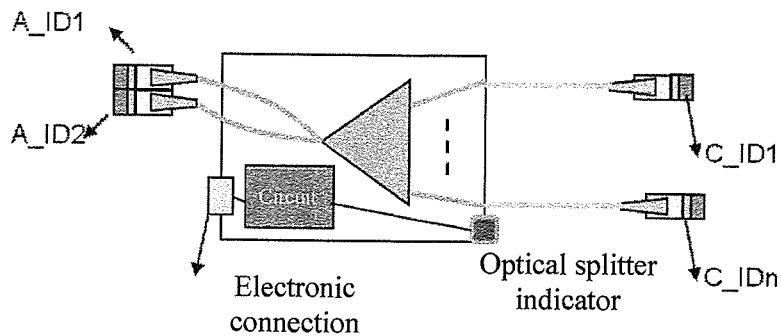
FIG. 4 is a schematic structural diagram of an optical splitter according to a second embodiment of the present invention.
Figure 5:
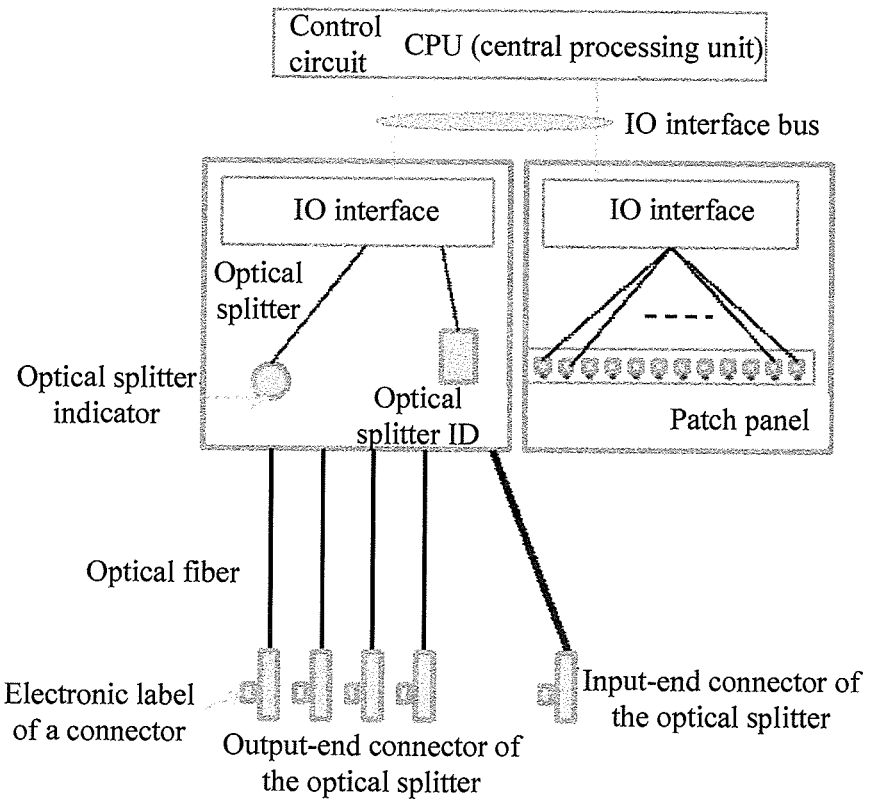
FIG. 5 is a schematic structural diagram of an optical splitter management system according to the second embodiment of the present invention, where a connector manner is adopted at both an input end and an output end of an optical splitter.

FIG. 4 and FIG. 5 show a second embodiment of the present invention. In this embodiment, as shown in FIG. 4, a connector (that is, an optical fiber connector) manner is adopted at both an input end (on the left of the figure) and an output end (on the right of the figure) of an optical splitter. An optical splitter input end of an optical splitter module is an optical fiber connector fixed on a casing of the optical splitter, where two connectors in the figure have identification information A_ID1 and A_ID2 respectively. The output end of the optical splitter has a pigtail and a connector, where n connectors in the figure have identification information C-ID1, . . . , and C-IDn respectively.

As shown in FIG. 4 and FIG. 5, each optical splitter contains an IO interface (circuit), an optical splitter module (SPL, triangle), an input-end connector, an output-end connector, an optical splitter indicator, and an optical splitter electronic label (ID, a small rectangular box on the bottom left of the figure). Each connector carries an electronic label. After the optical splitter module is inserted into the optical splitter, a read apparatus disposed in the optical splitter may read an optical splitter ID, where the optical splitter ID contains basic information of the optical splitter, such as an optical splitting ratio and an electronic recognition code (Device ID) for uniquely recognizing the optical splitter.

There is an electronic label ID in the optical fiber connector, where a port number and an electronic recognition code (ID) are disposed. A corresponding relationship between an ID of the connector and the optical splitter ID exists.

The optical splitter may contain a read circuit, configured to read an ID of a connector inserted into the optical splitter input end. The optical splitter ID is used for identifying the optical splitter module, and a corresponding relationship between the optical splitter ID and identification information C-ID of a connector of a pigtail exists. The optical splitter indicator may be configured to indicate the SPL module.

Embodiment Three

Figure 6:
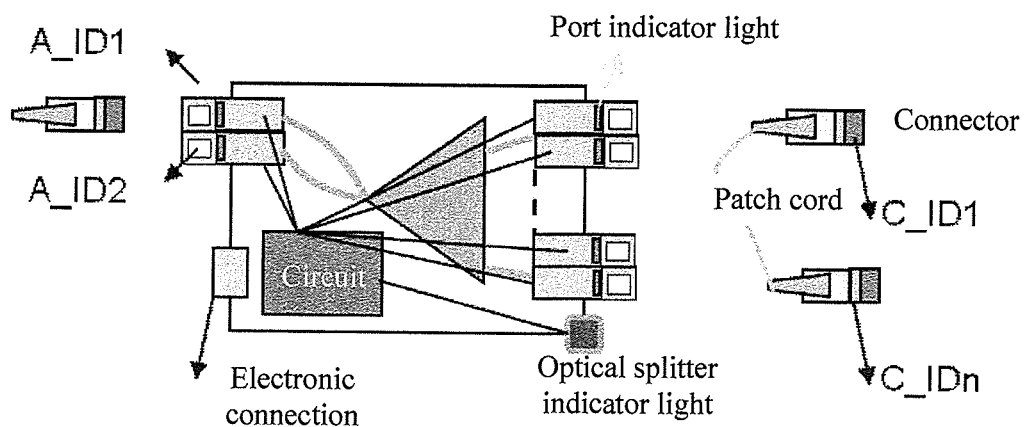
FIG. 6 is a schematic structural diagram of an optical splitter according to a third embodiment of the present invention.
Figure 7:
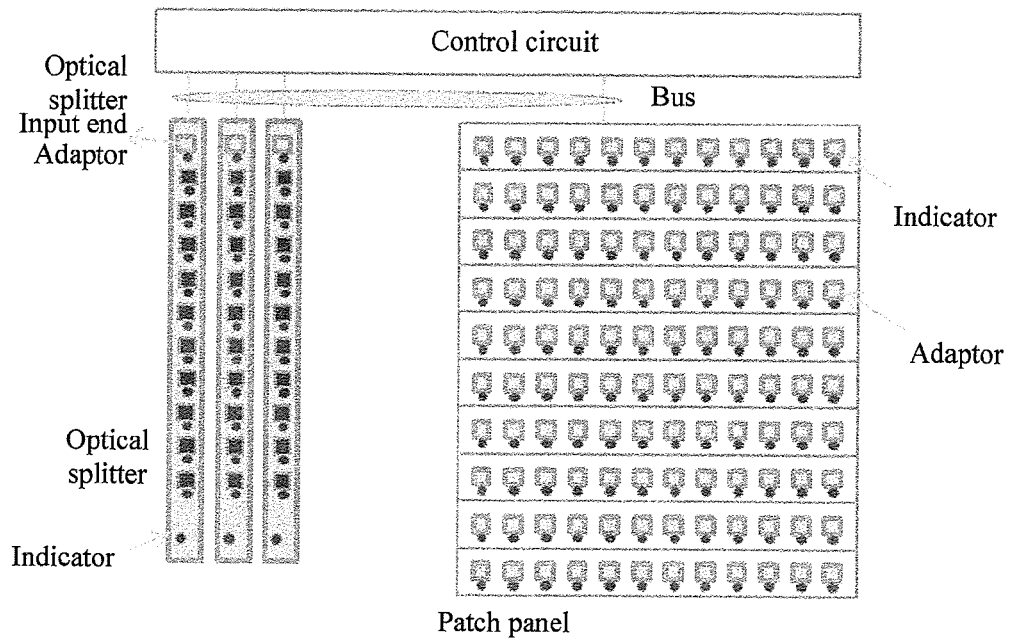
FIG. 7 is a schematic structural diagram of an optical splitter management system according to the third embodiment of the present invention, where an optical fiber adapter is adopted at an input end of an optical splitter.
Figure 8:
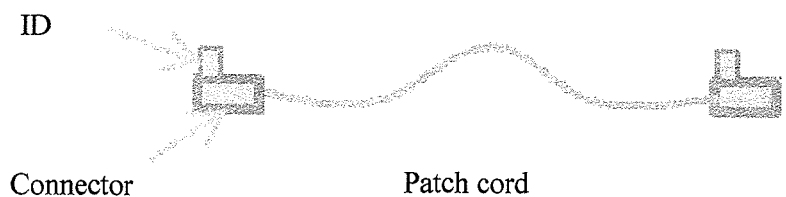
FIG. 8 is a schematic diagram of a patch cord having two connectors that contain an electronic label.
Figure 9:
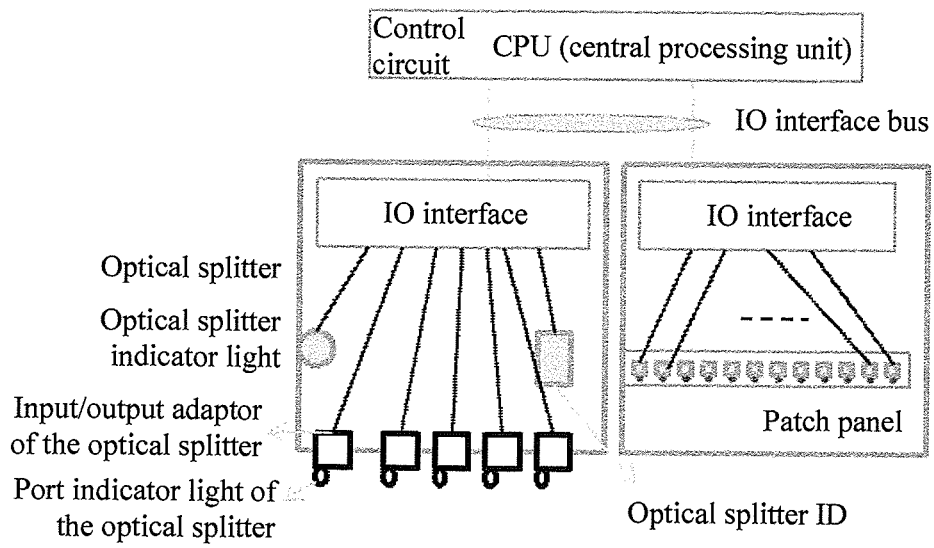
FIG. 9 is a schematic structural diagram of an optical splitter management system according to the third embodiment of the present invention, where an optical fiber adapter is adopted at an output end of an optical splitter.

FIG. 6 to FIG. 9 show a third embodiment of the present invention. In this embodiment, an optical splitter input end (on the left of FIG. 6) and output end (on the right of FIG. 6) of an optical splitter module both are optical fiber adapters fixed on a casing. As shown in FIG. 6 and FIG. 9, an optical splitter includes an optical splitter module (SPL, triangle in FIG. 6), an optical splitter indicator, a port indicator, an input-end adapter, and an output-end adapter. An optical splitter further contains multiple IO interfaces (circuits), and each IC interface corresponds to an optical fiber adapter.

The optical splitter module contains a recognition circuit, configured to recognize an ID of an optical fiber connector inserted into the optical splitter module and recognize the module itself. The optical splitter module further includes a read circuit, configured to read an ID of a connector inserted into an optical fiber adapter of the SPL, and in this way, the ID of the connector may correspond to a port number of the adapter, so as to generate a corresponding relationship table. The optical splitter indicator and the port indicator may be configured to indicate the SPL module and an outlet port respectively.

The optical splitter further has an electronic label (a small rectangular box on the lower left of FIG. 6) which contains identification information (ID) of the SPL module and is used for identifying the optical splitter module, and moreover, a corresponding relationship between this optical splitter ID and identification information C-ID of a connector of a pigtail exists.

There are several implementation manners for the optical splitter ID, and the simplest one is a level signal, where in a control module of a plug-in frame, there is an IO interface for recognizing slot information. The second one is a manner of adopting an electronic ID (for example, a module type identifier), which may uniquely identify the SPL module.

According to this embodiment, a typical process of connecting a patch cord between a patch panel and an optical splitter is as follows:

(1) Through bus control, an external control circuit lights up a port indicator of an optical splitter that needs insertion, and meanwhile, lights up an indicator of a corresponding port on the patch panel. (2) An operating person inserts a patch cord, of which both ends have an ID identifier each (as shown in FIG. 8), into the two ports whose port indicators being lit up. (3) The external control circuit reads IDs of connectors inserted into two adapters, and determines, according to the read IDs, whether the patch cord is a patch cord inserted as required; if yes, extinguishes the two port indicators, so as to give a prompt that an insertion operation is correct; otherwise, gives a prompt about an operation error by means of making an indicator of a port with an incorrect insertion operation flicker, and so on.

According to the embodiment of the present invention, the external control circuit may be a device in a management system for managing an optical device, for example, a central processing unit CPU. The management system may read, through the IO interface, the identification information stored in the electronic label and perform recognition processing, and provide a control signal for the optical splitter indicator and the port indicator, so as to implement management of optical devices including the optical splitter.

According to another embodiment of the present invention, the external control circuit may also be a device independent of the management system in the present invention. The management system may be a computer, hand-hold equipment, and so on. One interface for inputting an instruction is disposed in the external control circuit, and the interface connects to the management system; and the management system provides an operation instruction for the external control circuit through the interface. The external control circuit may implement an operation such as lighting, extinguishment, or flickering of an indicator according to the received operation instruction.

Embodiment Four

Figure 10:
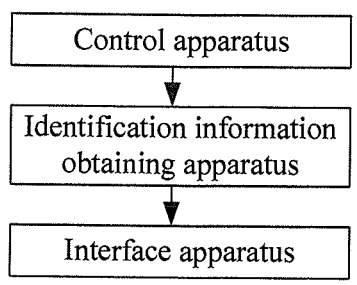
FIG. 10 is a schematic structural diagram of a system for managing an optical device according to a fourth embodiment of the present invention.

FIG. 10 shows a schematic structural diagram of a system for managing an optical device according to an embodiment of the present invention. The system includes: an interface apparatus, configured to couple multiple optical devices; an identification information obtaining apparatus, configured to obtain identification information of the optical devices and/or identification information of outlet ports of the multiple optical devices through the interface apparatus; and a control apparatus, configured to manage the optical devices according to the obtained identification information.

In the foregoing embodiment, the interface apparatus includes an IO interface bus; the identification information obtaining apparatus and control apparatus may be implemented by one central processing unit (CPU), and may also be implemented by two physically separated devices.

According to the embodiment of the present invention, by using an obtained optical splitter ID and port ID, the system may automatically collect statistics of a port usage state of an optical splitter, so as to avoid manual recording and inputting and ensure consistency of on-site data with data in a resource system. According to the obtained optical splitter ID, the system may conveniently find an optical splitter corresponding to the optical splitter ID, and through an indicator, give a prompt about an operation on the optical splitter. An operating person does not need to verify resource information (for example, a slot number of an on-site optical splitter), and on-site information and information in the resource system are consistent, which ensures that scheduling succeeds at the first time. Therefore, accuracy of used resources may be ensured, operation convenience is also improved, and correctness at the first time is ensured, and an on-site changing situation of resources can be automatically and accurately returned to the management system.

According to the foregoing embodiment of the present invention, in the present invention, mainly an electronic label for identification is added to the optical device, and meanwhile, an visual indicator is added, so as to form an electronically recognizable optical device; and the optical device may also be indicated by a light-emitting diode (LED) on site, so as to implement automatic recognition and management of the optical device.

In the present invention, by adding the indicator to assist the operating person in recognizing the optical device, on-site operating efficiency is improved, and manual searching of the operating person is not needed, which avoids an operation error; and by using the electronic label of the optical device, the optical device and the port information may be automatically recognized, which thoroughly avoids an original operating process of manual recording, inputting, and distribution, greatly improves scheduling efficiency, and completely ensures information accuracy, and avoids resource deposition. By using the automatically recognizable electronic label and the visual indicator on the optical device and a port of the optical device, the management system of the present invention may provide a basic capability for implementing automatic scheduling of all optical device ports, and improve an optical resource management level of an operator.

The foregoing descriptions are merely specific exemplary embodiments of the present invention, but are not intended to limit the protection scope of the present invention. Any variation or replacement solution easily figured out by persons skilled in the art within the scope of the technical content disclosed in the present invention shall fall within the protection scope of the present invention. Therefore, the protection scope of the present invention shall be subject to the protection scope of the appended claims.

What is claimed is:

1. An apparatus, comprising:
    an optical splitter module configured to implement an optical function, the optical splitter module comprising,
        an optical splitter input end having an optical fiber adapter configured to receive optical information from a first connector, wherein:
            the optical fiber adapter comprises identification information for identifying the optical fiber adapter; and
            the first connector comprises identification information for identifying the first connector, and
        a plurality of optical splitter output ends each configured to receive a pigtail and a second connector, each second connector comprising identification information for identifying the second connector;
    memory comprising identification information identifying the optical splitter module;
    an interface coupled to the memory and configured to connect to an external control apparatus, and wherein when the interface is connected to an external control apparatus, the external control apparatus is configured to read the identification information from the memory through the interface;
    a read unit configured to read identification information of the first connector when inserted into the optical splitter input end and provide the read identification information to the external control apparatus through the interface;
    a recognition unit configured to recognize, according to the identification information read by the read module, whether the inserted first connector is the one to which the optical splitter module expects to connect; and
    wherein a corresponding relationship exists between the identification information in the memory and the identification information of the first inserted connector.

2. The optical device according to claim 1, wherein the identification information comprises at least one item of the following information:
    manufacture information of the optical device, attribute information of the optical device, and a recognition code of the optical device.

3. The optical device according to claim 1, further comprising:
    a device indicator, configured to indicate a state of the optical device, wherein the device indicator is coupled to the external control apparatus through the interface, and is lit, is extinguished, or flickers under control of the external control apparatus.

4. The optical device according to claim 1, further comprising:
    at least one port indicator, configured to indicate a performed operation on or an operation state of one of the outlet ports, wherein the port indicator is coupled to the external control apparatus through the interface, and is lit, is extinguished, or flickers under control of the external control apparatus.

5. A system for managing an optical device, the system comprising:
    an interface apparatus, configured to couple multiple optical devices;
    an identification information obtaining apparatus, configured to obtain identification information of the optical devices and/or identification information of outlet ports of the multiple optical devices through the interface apparatus; and
    a control apparatus, configured to manage the optical devices according to the obtained identification information;
    wherein the optical device, comprising:
        an optical module, configured to implement an optical function of the optical device and comprising a plurality of outlet ports; and
        an identification module, containing identification information for identifying the optical device;
        an interface module, coupled to the identification module;
    wherein, the identification module is coupled to an external control apparatus through the interface module; and
        the external control apparatus is configured to read the identification information in the identification module through the interface module;
    a read module, configured to read identification information of a connector which is inserted into the outlet port, and provide the read identification information for the external control apparatus through the interface module; and
    a recognition module, configured to recognize, according to the identification information read by the read module, whether the inserted connector is the one to which the optical device expects to connect;
    wherein the optical module in the optical device is an optical splitter module; and each of an outlet ports comprises an optical splitter input end where an optical fiber adapter is adopted, and an optical splitter output end having a pigtail and a connector;
        the identification module contains identification information for identifying the optical splitter module; and
        the optical fiber adapter and the connector contain identification information for identifying the optical adapter or the connector; and
        the read module is configured to read identification information of a connector and another optical device which is inserted into the optical splitter input end; and the recognition module is configured to recognize the inserted connector according to the read identification information;
    wherein a corresponding relationship is a relationship between the identification information in the identification module of the optical splitter module and identification information of a connector of the pigtail exists.

* * * * *